Oct. 11, 1927.
G. W. ARTHUR
1,645,212
CORN SHOCKER
Filed Nov. 5, 1921  2 Sheets-Sheet 1
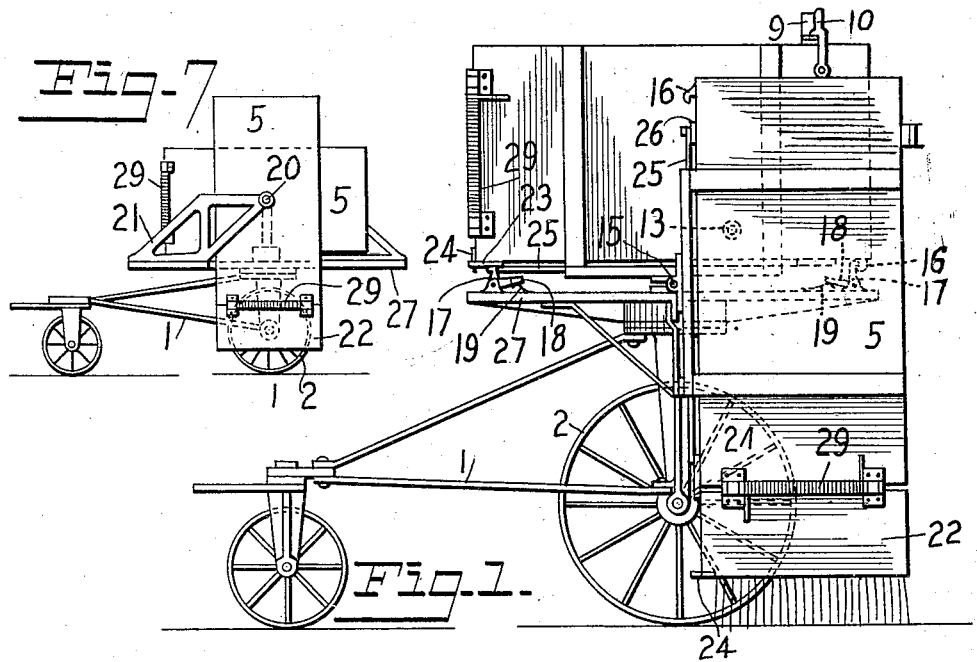
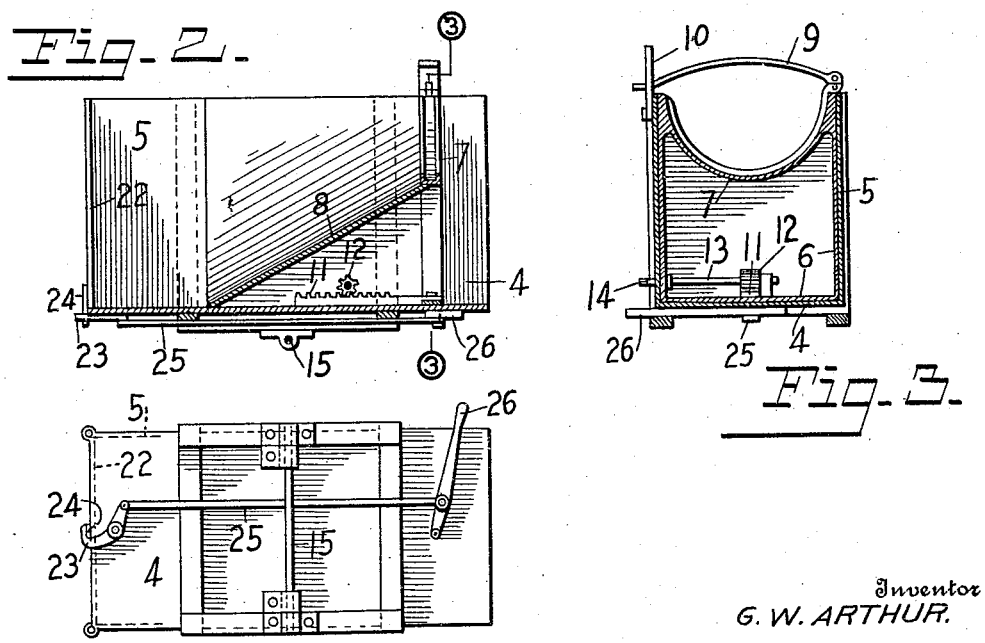
Inventor
G. W. ARTHUR.

Oct. 11, 1927.

G. W. ARTHUR 1,645,212

CORN SHOCKER

Filed Nov. 5, 1921  2 Sheets-Sheet 2

Inventor
G. W. ARTHUR.

Attorney

Patented Oct. 11, 1927.

1,645,212

UNITED STATES PATENT OFFICE.

GLENN W. ARTHUR, OF OSBORN, OHIO.

CORN SHOCKER.

Application filed November 5, 1921. Serial No. 513,093.

This invention relates to a corn shocker and while designed primarily for use with a corn harvester comprising cutting mechanism it is not limited to such use.

One object of the invention is to provide a corn shocking device which will receive the stalks of corn from which the shock is to be formed and support the same in a horizontal position during the forming of the shock and will then move the shock into a substantially vertical position before it is permitted to have longitudinal movement, thereby causing the shock to be dropped directly into engagement with the ground and preventing any distortion of the shock.

A further object of the invention is to provide such a device which will receive the stalks with the butt ends foremost and will be reversible to permit the formed shock to be discharged in the rear of the shocking device.

A further object of the invention is to provide such a device which will be simple in its construction and operation and of a strong, durable character.

Other objects of the invention will appear as the device is described in detail.

Figure 5:
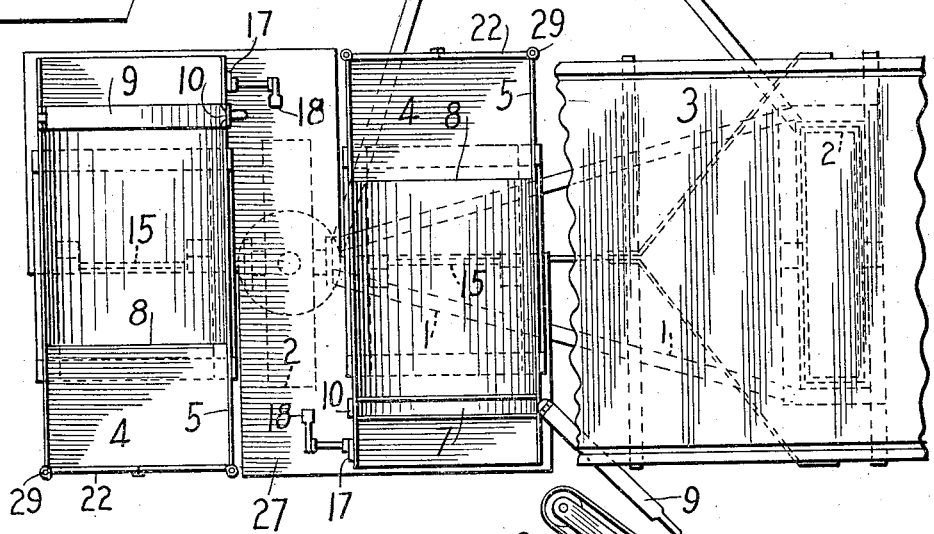
Figure 6:
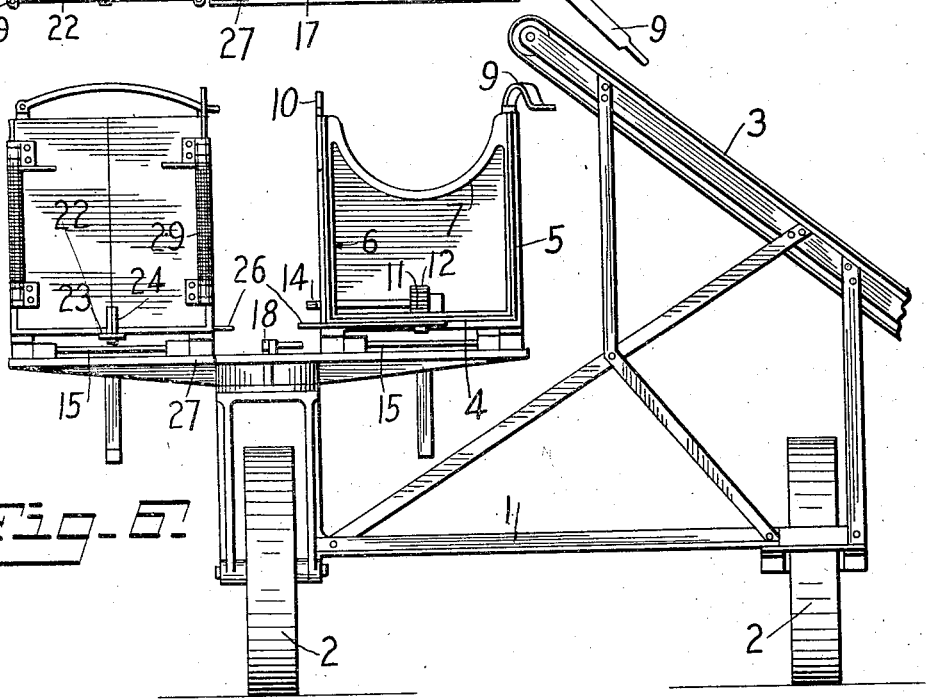

In the accompanying drawings Fig. 1 is a side elevation of an apparatus embodying my invention, showing one of the stalk receptacles in its vertical position; Fig. 2 is a longitudinal sectional view taken centrally through one of the stalk receptacles; Fig. 3 is a section taken on the line 3—3 of Fig. 2; Fig. 4 is a bottom plan view of one of the stalk receptacles; Fig. 5 is a plan view of the shocking device showing the conveyor partly broken away; Fig. 6 is an end elevation of the shocking device showing a portion of the conveyor; and Fig. 7 is a side elevation of a slightly modified form of the invention.

In these drawings I have illustrated one embodiment of the invention and have shown the same as forming a part of a corn harvester which employs cutting mechanism and a conveyor to deliver the stalks of corn to the shocking device. Inasmuch as the cutting mechanism may be of any suitable construction I have not illustrated the same and have shown but a portion of the conveyor. As here shown, the shocking device is mounted upon a supporting structure comprising a main frame 1 mounted upon ground wheels 2. On one side of the main frame 1 is supported the discharge end of a conveyor 3. Mounted on the supporting structure adjacent to the discharge end of the conveyor 3 is a receptacle adapted to receive the stalks of corn from the conveyor and support them during the forming of the shock. This receptacle may be of any suitable character but it is preferably trough shaped and, as here shown, comprises a box shaped structure having a bottom wall 4 and side walls 5, the receptacle being of such size and shape as to form a shock of the desired proportions.

Because of the larger size of the butt ends of the stalks the shock will taper upwardly, or rearwardly, when it is in a horizontal position, and I prefer to provide means for supporting the upper, or smaller, end of the shock in the upper portion of the receptacle. To accomplish this I have mounted in the receptacle a frame 6, the upper portion of which is formed by a transverse downwardly curved bar 7. Secured to the transverse bar 7 and extending forwardly and downwardly therefrom is an apron 8 curved in cross section and having its upper edges arranged near the upper edges of the side walls 5 of the receptacle. In order to compress the stalks into compact form before binding the shock I have mounted on the frame 6 a compressing bar 9 which is pivotally supported at one end so that it can be moved into an inoperative position during the forming of the shock and then swung across the shock and pressed downwardly to properly compress the stalks into compact form. A latch 10 engages the end of the bar and holds the same in its operative position during the binding of the shock. To accommodate the device to stalks of different lengths the supporting frame 6 may, if desired, be made adjustable and, as here shown, it is provided with a forwardly extending rack 11 with which meshes a pinion 12 carried by a shaft 13, one end of which projects through one of the side walls of the receptacle and is provided with means for rotating the same. As here shown, it is provided with a squared head 14 to receive a wrench or crank having a socket. It will be noted that the frame 6 and apron 8 move in unison and that the complete adjustment of the device may be accomplished by merely rotating the shaft 13.

After the shock has been formed it is moved into an upright position and then dropped onto the ground. To permit of this the receptacle is mounted on a horizontal axis, as shown at 15, and is held normally in its horizontal position by a suitable latch consisting of a locking member 16 rigidly secured to the rear end of the receptacle and adapted to be engaged by a pivoted dog 17 having a tail 18 acted upon by a spring 19 to hold the lug normally in its operative position. The tail 18 also forms a tripping device which may be engaged by the foot of the operator to release the receptacle. The axis of the receptacle being arranged near the center thereof the receptacle will tilt automatically as soon as it is released, because of the greater weight of the butt end of the shock. In Figs. 1 to 6 I have shown the axis about which the receptacle moves as arranged beneath the bottom of the receptacle but if it is desired to secure a better balance of the receptacle this can be accomplished by arranging the axis between the upper and lower edges of the receptacle, as shown at 20 in Fig. 7. As there shown the supporting structure is provided with a supplemental frame 21 on which the receptacle is pivoted.

The shock is held against longitudinal movement in the receptacle until the latter has attained a substantially vertical position when it is released to permit it to drop to the ground. Preferably this is accomplished by providing that end of the receptacle adjacent to the butt of the shock with a movable closure which is held normally in its closed position. As here shown, this closure comprises a two part end wall, or two doors, 22 which are hinged at their respective edges to the adjacent ends of the respective side walls 5 and are held normally in their closed positions by means of a latch 23 pivoted to the bottom wall of the receptacle and arranged to engage lugs, or pins, 24 extending downwardly from the lower edges of the two doors. The latch 23 is operated by means of a rod 25 arranged beneath the receptacle and provided at its rear end with an operating lever, or handle, 26. If desired, the doors may be provided with springs 29 which will return them to their closed positions after the shock has been discharged. In the operation of the device the shock is bound and the compression bar 9 is allowed to remain locked in its operative position until the latch 17 has been operated to release the receptacle and the latter has moved into a substantially vertical position. It will be noted from Fig. 1 that in this position the lower end of the receptacle is spaced some distance from the ground. With the receptacle in this position the latch 23 is operated to release the doors 22 and these are forced open by the weight of the shock, thus permitting the latter to drop downwardly into engagement with the ground, all parts of the butt of the shock engaging the ground at the same time, and thus preventing any distortion thereof, such as would result if the shock was tilted into an upright position about one edge thereof. The compression bar 9 serves to retain the shock within the receptacle during its tilting movement and to prevent it from being displaced by any jar which might result from the movement of the receptacle into a vertical position. This bar is preferably released before the shock is dropped but inasmuch as the bar in itself will not prevent the downward movement of the shock it may be released at any time before the receptacle is withdrawn from the shock.

The shock is formed in the receptacle with the bottom ends of the stalks foremost and in order that the shock may be discharged in the rear of the apparatus, thus permitting the apparatus to move away from the shock after it has been dropped into engagement with the ground, I have provided means for reversing the position of the receptacle so that when tilted the open upper side thereof will face toward the rear. To this end I have shown the receptacle as mounted on a revolving platform 27, forming a part of the supporting structure and pivotally mounted on the main frame on a vertical axis. That portion of the platform beneath the forward end of the receptacle is cut away so as to permit the latter to move about its horizontal axis. In this manner after the shock has been formed and bound the receptacle is reversed and then tilted into its vertical position with its open upper side facing rearwardly, thereby permitting the apparatus to be driven away from the shock.

In the present apparatus I have provided two shock receptacles, mounted on opposite sides of the platform 27 and having their forward ends facing in opposite directions, thereby enabling the filling of one receptacle to proceed while the binding and discharging of the shock in the other receptacle takes place. It will be noted that it is only necessary to stop the operation of the harvester for a very brief interval during the dropping of the shock. All the other operations may take place while the harvester is in motion.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a corn shocker, a supporting structure, a stalk receptacle comprising fixed side walls, having their upper edges spaced apart to receive the stalks between them, and having that end which receives the butts of the stalks extending forwardly, means for mounting said receptacle for movement into an upright position with its open side facing rearwardly and its butt receiving end adjacent to the ground, a closure for said butt receiving end of said receptacle comprising two parts hinged to the respective side walls and adapted to support said stalks, and releasable means for retaining said parts of said closure in their closed positions.

2. In a corn shocker, a supporting structure, a stalk receptacle comprising fixed side walls having their upper edges spaced apart to receive the stalks between them, means for mounting said receptacle for movement about a horizontal axis into an upright position with that portion of the receptacle which receives the butts of the stalks lowermost, means to control the movement of said receptacle about said axis, a closure for the lowermost end of said closure comprising two parts hinged to the respective side walls thereof, and releasable means to hold said closure normally against movement.

3. In a corn shocker, a supporting structure, mounted for movement about a vertical axis, two receptacles mounted on said structure for independent movement about horizontal axes, said receptacles having those portions which receive the butts of the stalks extending in opposite directions, whereby when one of said receptacles is in a position to receive said stalks the other of said receptacles may be moved about its horizontal axis into an upright position with its upper side extending rearwardly and that portion thereof which receives the butts of the stalks extending downwardly, and means for holding the stalks against lengthwise movement in said receptacles when the latter are moved about said horizontal axes.

4. In a corn shocker, a platform mounted for movement about a vertical axis, two receptacles mounted on said platform and each movable about a horizontal axis into a substantially vertical position, a movable closure for the downwardly moving end of each receptacle, and means for independently controlling said closures.

5. In a corn shocker, a receptacle mounted for movement about a horizontal axis and adapted to receive the stalks of corn from which the shock is to be formed, a supporting frame for the upper ends of said stalks comprising a curved bar and a forwardly and downwardly extending apron, a clamping bar cooperating with said curved bar to compress the stalks thereon, means for locking said clamping bar in its operative position, a movable closure for that end of the receptacle adjacent to the butt of the shock, and means for retaining said closure in its closed position.

6. In a corn shocker, a receptacle mounted for movement about a horizontal axis and adapted to receive the stalks of corn from which the shock is to be formed, a supporting frame for the upper ends of said stalks comprising a curved bar and a forwardly and downwardly extending apron, means for moving said frame lengthwise of said receptacle, a closure for that end of said receptacle adjacent to the butt of the shock, and means for controlling said closure.

In testimony whereof, I affix my signature hereto.

GLENN W. ARTHUR.